United States Patent
Evan et al.

(10) Patent No.: US 8,184,307 B2
(45) Date of Patent: May 22, 2012

(54) USER PREFERENCES IN A MULTI-PART WORKFLOW

(75) Inventors: Michael Evan, Webster, NY (US); Jonathan Levine, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 792 days.

(21) Appl. No.: 12/357,930

(22) Filed: Jan. 22, 2009

(65) Prior Publication Data
US 2010/0182629 A1 Jul. 22, 2010

(51) Int. Cl.
G06F 15/00 (2006.01)
G06F 3/12 (2006.01)
G06K 1/00 (2006.01)
(52) U.S. Cl. ...................... 358/1.13; 358/1.15
(58) Field of Classification Search .................. None
See application file for complete search history.

(56) References Cited

U.S. PATENT DOCUMENTS

2008/0273945 A1* 11/2008 Levine et al. .............. 412/1
2009/0185212 A1* 7/2009 Gustafson et al. ........ 358/1.15

* cited by examiner

*Primary Examiner* — Douglas Tran
(74) *Attorney, Agent, or Firm* — MH2 Technology Law Group LLP

(57) ABSTRACT

A book production method and system are disclosed. The method of book production allows an operator to input preferences for a multi-part workflow. The preferences can be communicated to a printer where the books are printed from a loaded plurality of book parts. There can be a deficient or excess number of loaded book parts in relation to that specified in a print job ticket. The user preferences can dictate how the book printer is to handle any deficiency or excess in the book parts. In such cases, the operator and the book printer can take appropriate action, and the book printer can indicate the status of the print job to the operator.

20 Claims, 4 Drawing Sheets

USER PREFERENCES IN A MULTI-PART WORKFLOW

FIELD OF THE INVENTION

The present invention generally relates to book production and, more particularly, relates to user preferences in a multi-part workflow.

BACKGROUND OF THE INVENTION

In a conventional digital book production workflow, electronic files for book blocks and covers are stored in a digital repository. To produce a book, the electronic files are retrieved and sent to a workstation or server, such as, for example, a digital front end (DFE) for data manipulation. The books can be printed by a cover-driven workflow where a printed book cover is automatically scanned to initiate the printing of its associated book block. A set of these covers can be stacked and read, one at a time. As each book block is printed and brought into the binder, the cover that initiated the job is also brought into the binder and bound to its book block.

Print jobs typically have an associated print job ticket that specifies how many books are to be printed in a customer order. Problems exist with conventional workflows because there are often variances in the number of materials available for a job and the number of books specified to be printed in the print job ticket. For example, variance problems occur when there are more covers loaded into a printer than are needed for a print job. Similarly, for example, variance problems occur when there are too few covers loaded into a printer than are needed for a print job.

The variance problems can lead to inefficiencies in the printing process as well as lost productivity time. Further, overprinting of books can cut into the cost of materials. Thus, there is a need to overcome these and other problems of the prior art and to provide a way for a system operator to handle these situations.

SUMMARY OF THE INVENTION

In accordance with the present teachings, a method of book production is provided. The exemplary method can include identifying one or more user preferences and a print job ticket specifying a number of books to be printed, wherein the one or more user preferences specify a handling of a variance in a number of book parts loaded into a book printer with the number of books to be printed. The one or more user preferences and the print job ticket can be transmitted to the book printer.

In accordance with the present teachings, another method of book production is provided. The exemplary method can include receiving a print job ticket specifying a number of books to be printed, wherein the print job ticket comprises one or more user preferences specifying a handling of a variance in a number of loaded book parts with the number of books to be printed. Books can then be printed in accordance with the print job ticket and the one or more user preferences.

In accordance with the present teachings, a book production system is provided. The exemplary book production system can include an operator station that identifies one or more user preferences and a print job ticket specifying a number of books to be printed, wherein the one or more user preferences specify a handling of a variance in a number of book parts loaded into a book printer with the number of books to be printed; and transmits the print job ticket and the one or more user preferences to the book printer. The exemplary system can further include the book printer that receives the print job ticket and the one or more user preferences from the operator station, and prints books in accordance with the print job ticket and the one or more user preferences.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

It should be appreciated that the exemplary methods depicted in FIGS. 1A and 2-4 can be employed for any print workflow environment where multiple parts of the job are produced on different devices or at different times on the same device such as, for example, any combination of book covers, book blocks, dust jackets, and any other book parts included in book production. As such, the exemplary methods can be employed for a cover-driven workflow, a book block-driven workflow, a dust jacket-driven workflow, and any other workflows associated with book production. For illustrative purposes, the exemplary methods described herein will employ a cover-driven workflow. Before a cover-driven print job is carried out, it can be assumed that a plurality of book covers have been loaded into a specified book block printer. For example, the book covers can be loaded into a bypass tray or an interposer of the book block printer.

Figure 1A:
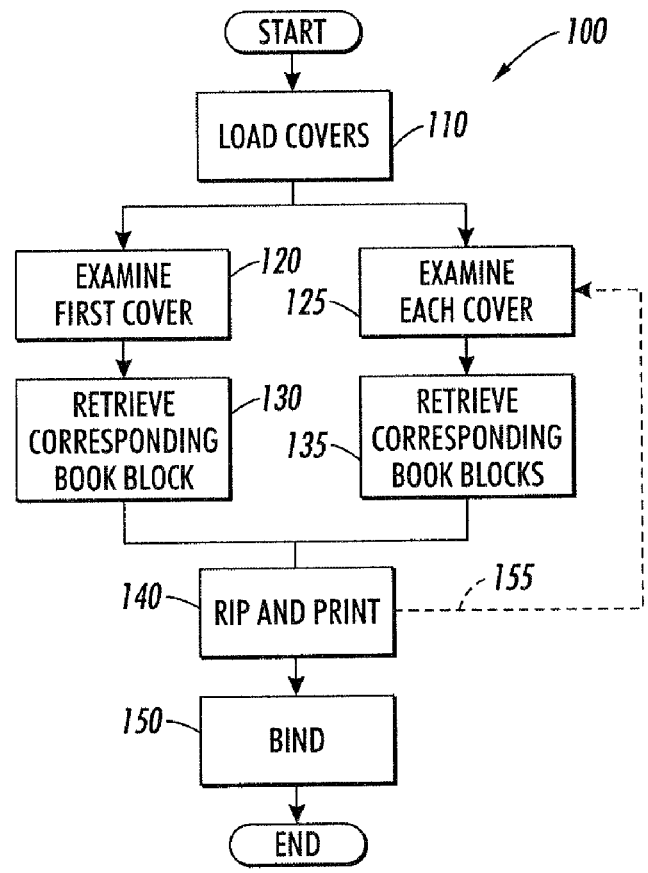
FIG. 1A depicts an exemplary method for cover-driven book production in accordance with embodiments of the present teachings.

FIG. 1A depicts an exemplary method and system for cover-driven book production. The exemplary method and system include in-line binding in which the printed covers are automatically or semi-automatically transported to the binding equipment. The exemplary method and system also include off-line binding in which printed covers are manually transported to the binding equipment.

As used herein, the term "raster image processing" or "RIP" refers to a process of turning digital information into a high-resolution raster image. For example, the RIP can take digital information about fonts and graphics from a PostScript file that describe the appearance of the file and translate that information into an image composed of individual dots that an imaging device can output.

As used herein, a digital front end (DFE) can be a workstation, server, or computer that can manipulate data, for example, RIPing a Postscript file, before it is sent to a printer.

Further, as used herein, book parts can refer to book covers, book blocks, dust jackets, and any other book parts included in book production. Still further, as used herein, a variance can be a mismatch or difference between the number of books to be printed, as specified in a print job ticket, with the number of book parts loaded into a book printer Referring to FIG. 1A, exemplary methods 100 for cover-driven book production with in-line binding are depicted. In 170, a plurality of printed covers can be loaded into a book block printer. For example, the printed covers can be loaded into a bypass tray or an interposer of the book block printer. According to various embodiments, each of the plurality of covers can be the same and, in 120, the first cover can be examined.

Examining the first cover in 120 can be accomplished by a scanner integrated into or positioned near the bypass tray. Alternatively, if no scanner is available in or near the bypass tray, a hand-held scanner can be used. After the first cover is examined and identified, a book block corresponding to the identified cover can be retrieved as shown in 130. Identifying the cover can, for example, utilize a bar code and/or a data glyph, extract semantic information from the first cover, and/ or recognize unique characteristics of the first cover. The book block can be in the form of an electronic file stored in an electronic book repository.

The book block file can then be RIPed and printed as shown in 140. As each complete book block is printed, a cover can be fed from the bypass tray for binding to the book block as shown in 150. In the disclosed embodiment in which only the first cover of the plurality of covers is examined, no variance checking is performed. In various embodiments, a user can ensure that the first cover examined is the same as all of the covers loaded into the bypass tray.

Referring again to FIG. 1A, another exemplary method 100 is provided in which variance checking is performed. As shown in 125, one cover of a plurality of covers can be examined and identified. As before, examining the cover in 125 can be accomplished by a scanner positioned in or near the bypass tray. Alternatively, if no scanner is available in or near the bypass tray, a hand-held scanner can be used. After the cover is examined and identified, a book block corresponding to the identified cover can be retrieved, for example from a book repository, as shown in 135.

The retrieved file corresponding to the identified book block can then be RIPed and printed in 140 and then sent for binding in 150. In various embodiments, as the retrieved file corresponding to the identified book block is RIPed and printed in 140 and, the identified cover can be fed for binding in 150. Alternatively, the identified cover can be fed for binding at any time after it is examined and identified. As the identified cover is being fed in 150, the next cover of the plurality of covers can be examined and identified. This is represented by dotted line 155. As the next cover is being examined and identified, binding of the first cover to the printed book block can be accomplished in 150. This cycle can continue until each of the plurality of covers has been examined.

Because each cover of the plurality of covers can be examined before its corresponding book block is retrieved and printed, covers corresponding to more than one book block can be loaded into the bypass tray. For example, 10 covers from a first book, 15 covers from a second book, and 20 covers from a third book can be loaded into the bypass tray. The book block corresponding to the first book can be retrieved and printed after each of the 10 covers is identified. Subsequently, the book block corresponding to the second book can be retrieved and printed after each of the 15 covers is identified. And, the book block corresponding to the third book can be retrieved and printed after each of the 20 covers is identified. One of ordinary skill in the art understands that these numbers are exemplary and that the number of different covers can vary, and that the number of each cover can vary.

In various embodiments, examining the cover at 120 can initiate a program that controls printing of the book block. The program can be stored, for example on a printer, a DFE, workstation, or a server. The program can provide at least one of registration points, paper size, image size, and image location. The program can further control printing parameters, such as, for example, the number of books desired and/or specified on a job ticket.

Examining each cover can have additional benefits. For example, in various embodiments in which it is desirable to print a specified number of books, errors can occur if the number of covers loaded into the bypass tray does not correspond to the number of desired books. For example, the job ticket may specify x number of books to be printed, but more than x or less than x number of covers may have been loaded into the bypass tray. If such an error occurs, only the specified number of book block will be printed. Excess covers will not be fed, and the user will be notified of the error after the specified number of covers are bound to the correct number of book blocks.

In various embodiments, the book block printer can include a second bypass tray or interposer into which a second plurality of covers can be loaded. For example, while the book block corresponding to the first plurality of covers is being printed and bound, the second plurality of covers can be loaded into the second bypass tray. By identifying the covers and retrieving the book block corresponding to the second plurality of covers, the second book block can be ready for printing when as soon as the first book block is finished printing.

Referring again to FIG. 1A, an exemplary cover-driven book production method using off-line binding is also provided. The exemplary off-line method can begin at 120 by examining, for example, a first cover of a plurality of covers using a hand-held scanner. Once the cover is examined and identified, retrieval of the corresponding book block can be initiated at 130.

As previously disclosed, examining and identifying the cover at 125 or 120 can initiate a program that controls printing of the book block. The program can be stored, for example on a printer, a DFE, workstation, or a server. The program can control printing parameters, such as, for example, the number of book blocks to be printed to correspond to the number of covers. After RIPing and printing at 140, the plurality of covers and the printed book blocks can be manually transported and loaded into binding equipment for binding.

Some drawbacks exist in the exemplary methods 100 as described above. For example, problems can occur where there is a variance in the number of books to be printed, as specified in a print job ticket, with the number of book parts loaded into a book printer. For example, a book printer can have more loaded covers than are needed to complete a job as specified by a print job ticket, or the book printer can have a deficient number of covers that are needed to complete a job. The exemplary methods 100 as described above do not allow the workflow operator to specify how to handle these and similar situations. The present disclosure aims to solve these situations by enabling the workflow operator to specify user preferences to handle a variance and send the preferences to the printer. The user preferences govern how the printer and any associated programs are to handle a variance, namely, a deficiency or an excess, of book parts.

Figure 1B:
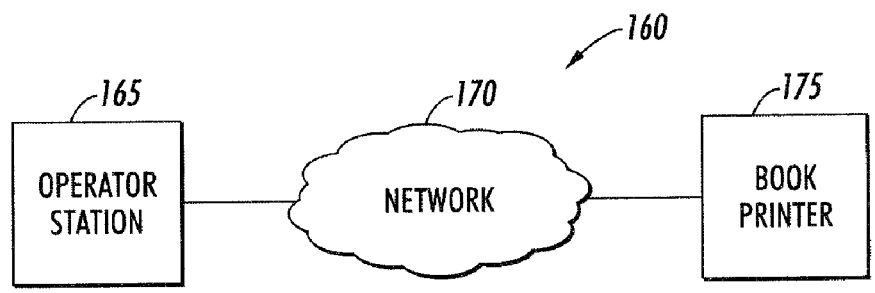
FIG. 1B depicts an exemplary book production system with an operator station.

FIG. 1B illustrates an overall book production system 160 with an operator station. Embodiments described herein can be implemented in or supported by the exemplary environment illustrated in FIG. 1B. The overall system 160 enables a workflow operator to specify user preferences to a book printer.

In embodiments as shown, FIG. 1B includes an operator station 165, a network 170, and a book printer 175. The network 170 can be implemented on one or more servers or on other hardware, and can provide a gateway for the operator station 165 to connect to the book printer 175. The network 170 can be configured as a personal area network, a local area network, a metropolitan area network, a wide area network, the Internet, an intranet, an extranet, a virtual private network, a peer-to-peer network, and a wireless self-configuring network. In embodiments, the operator station 165 can connect to the book printer 175 via a hard wire connection.

The operator station 165 can connect to the book printer 175 and can help control the functionality of the book printer 175 through a set of user preferences. The book printer 175 can provide operational feedback to the operator station 165. The operator station 165 can be any type of computer or machine capable of sending data to and/or receiving data from the book printer 175. In embodiments, the operator station 165 can be a digital front end (DFE) as described above.

The book printer 175 can be any printer used in a conventional digital book production workflow, as are known to persons of ordinary skill in the art. The book printer 175 can be used to print book covers, book blocks, dust jackets, or any other parts of a book in accordance with a conventional book production system.

The set of user preferences can be specified at a system configuration level so that all incoming jobs are subject to the preferences. In embodiments, the set of user preferences can be manually set by an operator at the operator station 165 depending on the print job. Further, a default set of user preferences can be set in the absence of an operator or system administrator setting the preferences. The set of user preferences can be included in a print job ticket, which is sent to the book printer 175 specifying how the print job is to be carried out. The print job ticket can be generated based on the preferences of a client or operator, or on other factors, and can be generated at the system configuration level or at the operator station. In embodiments, the user preferences can be inputted into the book printer 175 directly without input from the operator station 165. Further, in embodiments, the print job ticket can include a set of overriding user preferences that can override the configuration-level user preferences.

The operator can manually override set user preferences for a particular print job. For example, an operator can manually set preferences different from those already set at the system configuration level by programming the job with the manually-set preferences. The manually-set preferences can be included in the print job ticket. When the job is submitted, the system 160 can read the print job ticket, detect the manually-set preferences, and override the system configuration preferences. The system 160 can then instead use the manually set preferences included in the print job ticket to carry out the print job.

The system 160 can further store associated preference groups. The preference groups can each correspond to a client, genre, type of book, or any other group, individual, or category involved in the book printing business. For example, one preference group can relate to a specific customer or client account. The preference groups can each have an associated set of user preferences. For example, one client may want to specify that the number of printed copies in a completed print job must be within 2% of the number of copies ordered. When a system operator is programming a job, the operator can select the corresponding preference group, and the corresponding user preferences are included in the print job ticket. When this job is submitted for printing, the system 160 can detect that the preference group user preferences have been programmed into the print job ticket, and can override the system configuration preferences and instead use the preference group user preferences in the print job ticket.

Figure 2:
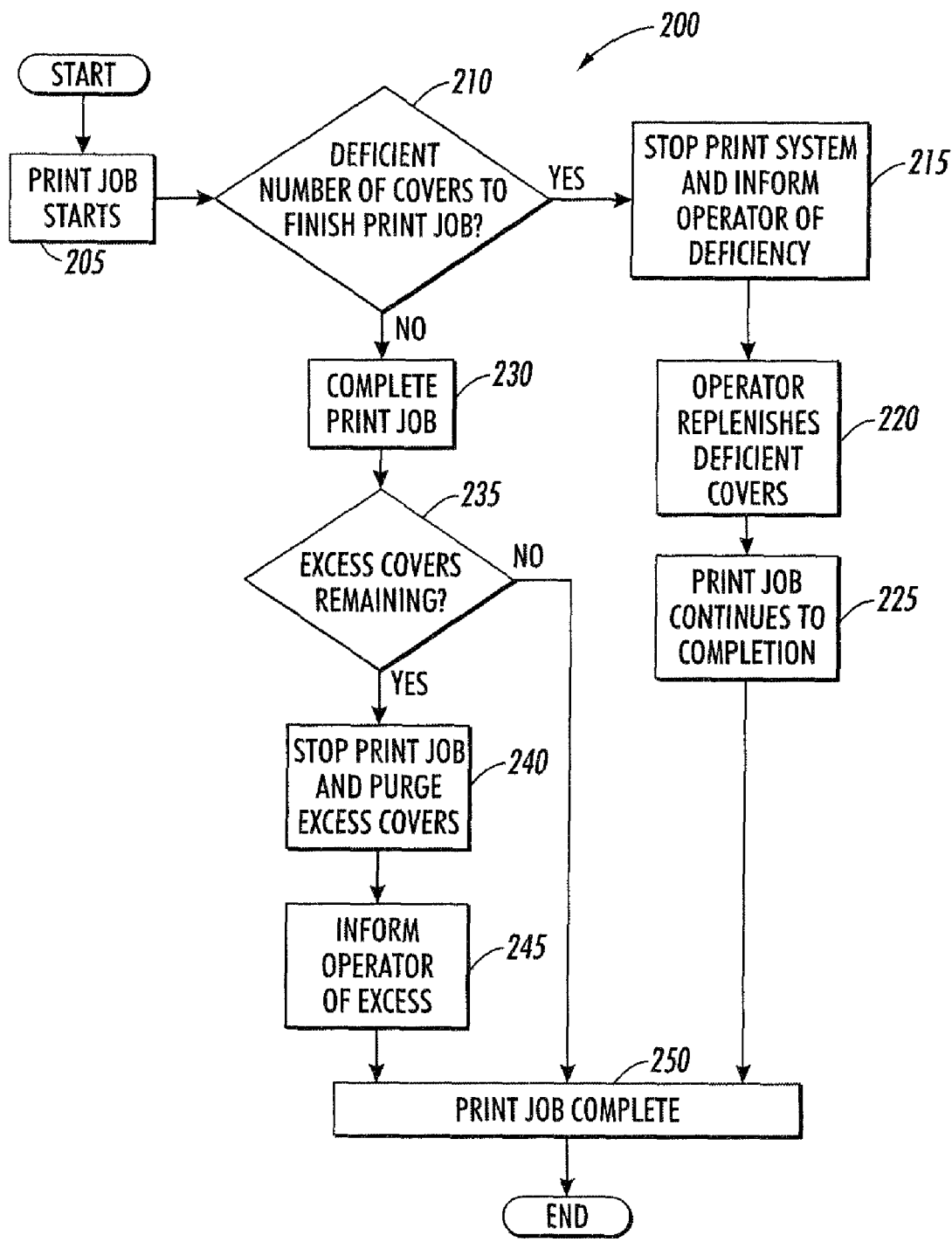
FIG. 2 depicts an exemplary method for providing user preferences in a multi-part workflow.
Figure 3:
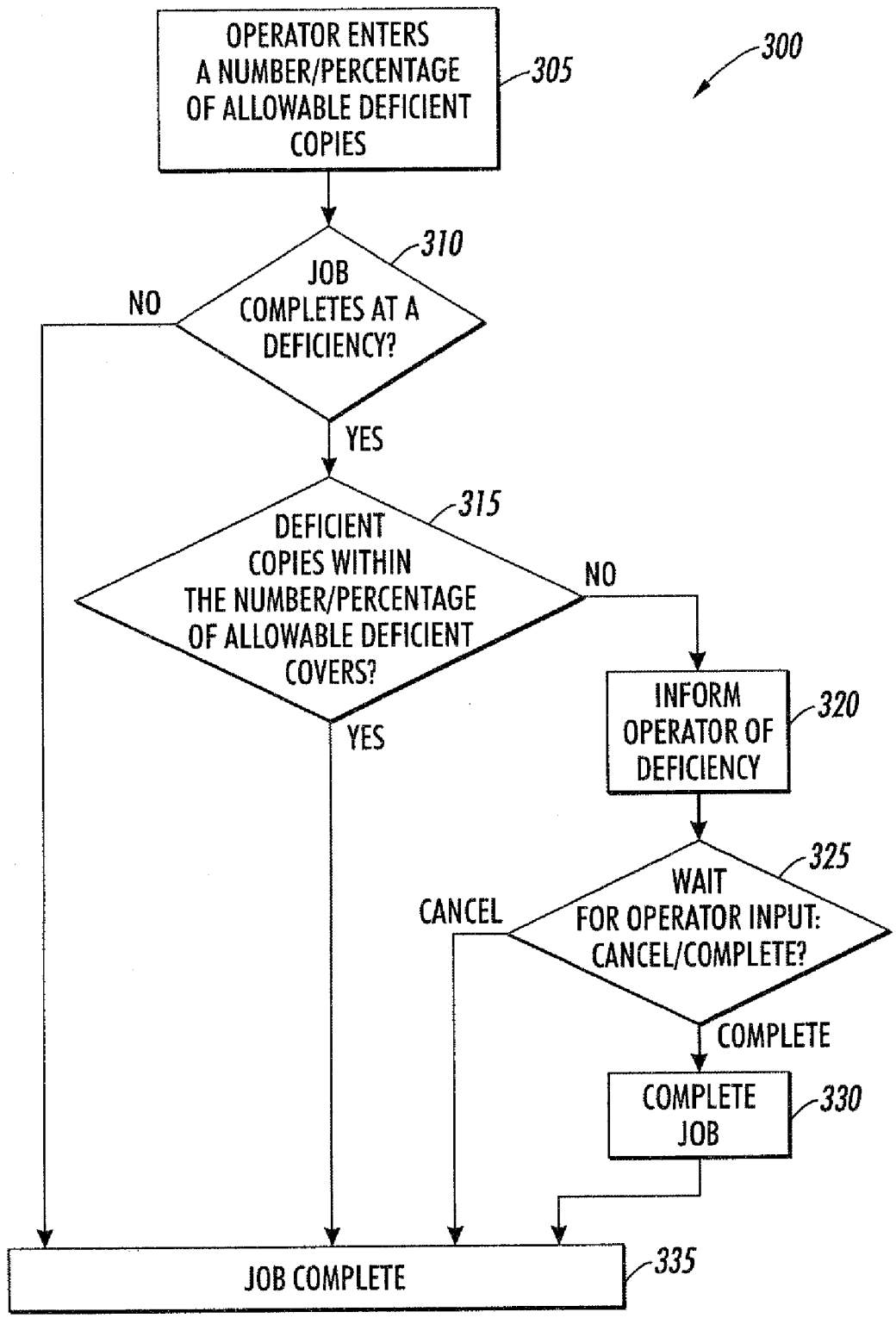
FIG. 3 depicts an exemplary method for providing user preferences in a multi-part workflow.
Figure 4:
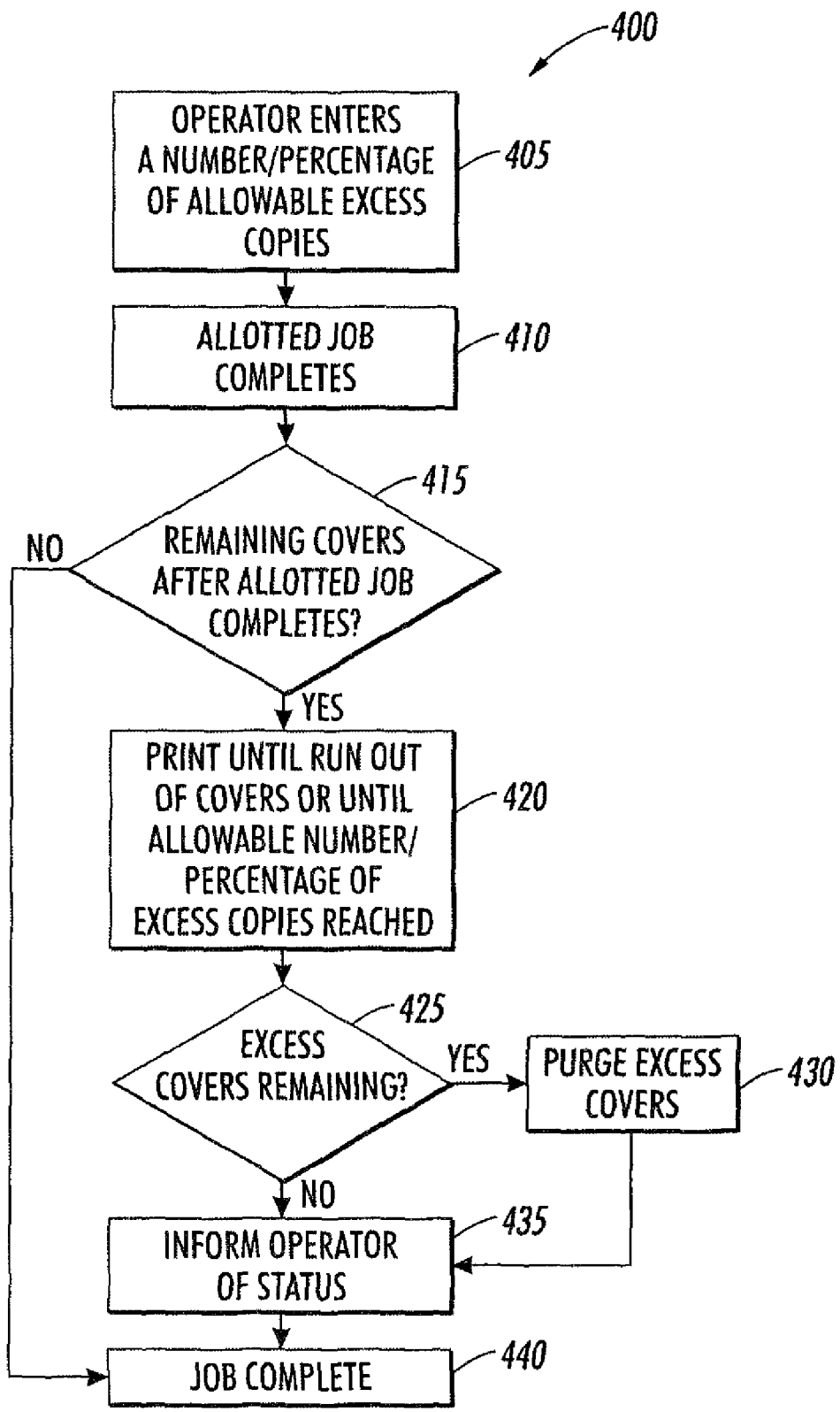
FIG. 4 depicts an exemplary method for providing user preferences in a multi-part workflow.

FIGS. 2-4 depict exemplary methods for providing user preferences in a multi-part workflow. It should again be appreciated that the exemplary methods as depicted in FIGS. 2-4 can be employed for any print workflow environment where multiple parts of the job are produced on different devices or at different times on the same device such as, for example, any combination of book covers, book blocks, dust jackets, and any other book parts included in book production. For illustrative purposes, the exemplary methods described herein will employ a cover-driven workflow.

The exemplary systems and methods described herein can provide a way for the operator of a print workflow to specify how the automated printing system is to handle variances in the number of books loaded into a book printer with the number of books to be printed as specified by a print job ticket. Specifically, in a cover-driven workflow, a situation can arise where there are too few covers at a printer to fulfill an order for a set of books. A further situation can arise when a printer has more covers than are necessary to fulfill an order for a set of books. These situations can cut down on efficiency and production time, and can increase the costs associated with printing books. The systems and methods described herein allow an operator of the operator station 175 to specify preferences on how the printing device should handle the situations. For example, an operator can specify how the printing device should handle the situations relating to variances, namely, under and over counts, as explained above. Also, for example, the operator can set default preferences such that the printing system in the cover-driven workflow is to print as many books as covers that the printer encounters, and when the covers run out, the printing system can start the next print job.

It shall be assumed that in the exemplary systems and methods described herein, the book printer can output a status message in the form of an email, text message, screen popup, instant message, phone call, and any other form of communication data. Further, in the embodiment, the system can be configured to purge excess book covers. However, if the system hardware does not allow automated purging, then the system can be configured to cycle down and send a status message indicating that the excess book covers need to be removed before the additional jobs can continue. The operator or user can choose to physically remove the extra covers or tell the system to continue printing the remaining books for that job.

Referring to FIG. 2, an exemplary method 200 for enabling user preferences in a cover-driven book production system is depicted. Prior to exemplary method 200 commencing, an operator can set user preferences relating to what the printer should do if the system encounters variances. Specifically, if the system encounters too few loaded covers to fulfill the job, and if the system encounters too many loaded covers to fulfill the job. The operator station 165 can send the user preferences to the book printer 175 as described above. In embodiments, the user preferences can be inputted into the book printer 175 directly. Further, the operator station 165 can send a print job ticket to the book printer 175

In 205, a print job starts at the book printer 175 according to the print job ticket and user preferences stored locally or received from the operator station 165, and other components involved in the printing process. The print job ticket can include information about the print job itself such as, for example, how many copies of the book to print, the quality of the printing, the page size, and any other data relating to how the print job is to be conducted. The user preferences can be those set by an operator at the operator station 165.

In 210, the book printer 175 can determine if there are a deficient number of covers to finish the print job by comparing the number of books specified to be printed in the print job ticket to the number of covers loaded into the book printer 175. For example, the book printer 175 can determine that the print job ticket requests 100 books to be printed, but that there are only 90 covers loaded into the book printer 175. In embodiments, in 210, if after the print job completes, the book printer 175 can determine if there are a deficient number of covers to finish the print job by comparing the number of books specified in the print job ticket to the number of books actually printed. For example, the book printer 175 can determine that there is a deficiency if a print job ticket requests 100 books to be printed, but upon the job completing, only 90 books were actually printed.

In either situation, if a deficiency exists in the number of covers to finish the print job, the book printer 175 can stop the printing and inform the operator of the deficiency, including the number of deficient covers, in 215. In 220, the operator can replenish the book printer 175 with the appropriate number of additional covers to satisfy the deficiency. For example, if the deficiency is 10 covers, then the operator can load 10 covers into the book printer 175. Once the covers are replenished, the print job continues to completion, in 225. In 250, the print job is marked complete, and the book printer 175 can start the next print job.

Referring back to step 210, if no deficiency exists in the number of covers to finish the print job, then the job will complete according to the print job ticket, in 230. In 235, the book printer 175 can determine if any excess covers remain loaded into the book printer 175. If no excess covers remain, then the job is marked complete, in 250. If excess covers do remain, then the book printer 175 can stop the print job and purge the excess covers, in 240. For example, if a print job ticket requests 100 books to be printed, and there are 5 covers left over after the print job has completed, then the book printer 175 can purge the 5 excess covers. In 245, the book printer 175 can send a message to the operator station 165 informing the operator that the book printer 175 printed the correct number of books. Further, the message can include the number of excess covers that were purged. Finally, in 250, the print job can be marked complete. In embodiments, the book printer 175 can then commence a new print job.

Further exemplary methods for the user-preference printing systems as disclosed above will now be discussed with reference to FIGS. 3 and 4.

Referring to FIG. 3, an exemplary method 300 for enabling user preferences in a cover-driven book production system is depicted. FIG. 3 relates to the situation where a print job does not complete because a deficient number of book covers exist, as described above. Similar to the method as described in FIG. 2, the exemplary method 300 assumes that the operator station 165 is connected to the book printer 175 via the network 170 or some other connecting means. In embodiments, the user preferences as described herein can be inputted directly into the book printer 175.

In 305, an operator at the operator station 165 can enter a number or percentage of allowable deficient copies. After the job completes, the book printer 175 determines if the job completed at a deficiency, or rather, if the book printer 175 runs out of covers before the order in the print job ticket is fulfilled, in 310. If the job did not complete at a deficiency, or rather, if the order in the print job ticket was fulfilled, the job is marked complete, in 335. If the job did complete at a deficiency, the book printer 175 can determine if the number of deficient copies is within the number or percentage of allowable deficient copies, in 315.

For example, if the operator enters "5%" as the percentage of allowable deficient copies and the job completes 99 out of 100 books as specified by a print job, the system will consider the job complete. Similarly, for example, if the operator enters "5" as the number of allowable deficient copies and the job completes 99 out of 100 books as specified by a print job, the system will consider the job complete. Accordingly, in both situations, the deficiencies are within allowable limits, and the job is marked complete, in 335.

In contrast, the job can complete outside of an allowable deficiency. For example, if the operator enters "5%" as the percentage of allowable deficient copies and the job only completes 94 out of 100 books as specified by a print job ticket, the system will not consider the job complete. Similarly, for example, if the operator enters "5" as the number of allowable deficient copies and the job only completes 94 out of 100 books as specified by a print job ticket, the system will not consider the job complete. In this case, in 320, the book printer 175 can inform the operator of the deficiency via a message, including the number of covers that need to be loaded to complete the correct print job as specified by the print job ticket.

Next, in 325, the system will cycle down and wait for input from the operator. For example, the operator can choose to cancel the print job and have the system move on to the next job, or the operator can replenish the remaining covers to satisfy the deficiency and then resume printing. In embodiments, the user can replenish up to the point of the allowable deficiency, or to satisfy the original print job ticket request, or to any other amount. If the operator chooses to cancel the print job, the job is marked complete, in 335. If the operator chooses to replenish the covers, the job completes, in 330, and is subsequently marked complete, in 335.

Referring to FIG. 4, an exemplary method 200 for enabling user preferences in a cover-driven book production system is depicted. FIG. 4 relates to the situation where the system encounters a number of loaded covers in excess of that needed to fulfill the print job, as described above. Similar to the methods as described in FIGS. 2 and 3, the exemplary method 400 assumes that the operator station 165 is connected to the book printer 175 via the network 170 or some other connecting means. In embodiments, the user preferences as described herein can be inputted directly into the book printer 175.

In 405, an operator at the operator station 165 can enter a number or percentage of allowable excess copies. In 410, the allotted job according to a print job ticket can complete. After the job completes, the book printer 175 can determine if there exist any remaining unprinted covers, in 415. If no unprinted covers remain, then the job can be marked complete, in 440. In contrast, if unprinted covers remain, then the book printer 175 can continue to print until it runs out of excess covers or until the book printer 175 prints up to the number or percentage of allowable excess copies, whichever occurs first, in 420.

For example, if the operator enters "7%" as the percentage of allowable excess copies and the job completes 100 out of 100 books as specified by a print job ticket, the system can continue to print until it runs out of excess covers or until it prints an additional 7 covers, whichever occurs first. Similarly, for example, if the operator enters "5" as the number of allowable excess copies and the job completes 100 out of 100 books as specified by a print job request, the system can continue to print until it runs out of excess covers or until it prints an additional 5 covers, whichever occurs first.

Once either the book printer 175 runs out of excess covers or prints up to the threshold number or percentage of allowable excess copies, the book printer 175 can determine if any excess covers remain, presumably when the book printer prints up to the threshold, in 425. If any excess covers remain, then the system can purge the excess covers, in 430. In embodiments, the system can skip this step. If after determining if any excess covers remain or purging the excess covers, the book printer 175 can inform the operator of the status of the print job via a message, in 435. The status can include, for example, how many copies of the book were printed, the number of excess copies printed, how many covers were purged, and other data relating to the print job. Next, in 440, the job is marked as complete.

While the invention has been illustrated with respect to one or more exemplary embodiments, alterations and/or modifications can be made to the illustrated examples without departing from the spirit and scope of the appended claims. In addition, while a particular feature of the invention may have been disclosed with respect to only one of several embodiments, such feature may be combined with one or more other features of the other embodiments as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." And as used herein, the term "one or more of" with respect to a listing of items, such as, for example, "one or more of A and B," means A alone, B alone, or A and B.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of book production comprising:
  identifying a print job ticket specifying a number of books to be printed;
  identifying one or more user preferences, wherein the one or more user preferences specify a handling of a variance between a number of book parts loaded into a book printer and the number of books to be printed; and
  transmitting the print job ticket and the one or more user preferences to the book printer.

2. The method of claim 1, further comprising:
  receiving feedback from the book printer.

3. The method of claim 1, wherein the print job ticket further specifies one or more overriding user preferences, wherein the one or more overriding user preferences override the one or more user preferences.

4. The method of claim 1, further comprising:
  allowing an operator to override the one or more user preferences.

5. The method of claim 1, wherein the one or more user preferences are associated with one or more preference groups.

6. The method of claim 1, wherein the job ticket and the one or more user preferences are generated at a system configuration level.

7. The method of claim 1, wherein the one or more user preferences are set by default.

8. A method of book production comprising:
  receiving a print job ticket specifying a number of books to be printed, wherein the print job ticket comprises one or more user preferences specifying a handling of a variance between a number of loaded book parts and the number of books to be printed; and
  printing books in accordance with the print job ticket and the one or more user preferences.

9. The method of claim 8, further comprising:
  providing feedback to an operator.

10. The method of claim 8, further comprising:
  purging an excess number of the loaded book parts.

11. The method of claim 8, further comprising:
  waiting for an operator to replenish a deficiency of the loaded book parts.

12. The method of claim 8, wherein the one or more user preferences are associated with one or more preference groups.

13. The method of claim 8, wherein the variance in the number of loaded book parts with the number of books to be printed is a number or a percentage.

14. A book production system comprising:
  an operator station configured to:
    identify one or more user preferences and a print job ticket specifying a number of books to be printed, wherein the one or more user preferences specify a handling of a variance between a number of book parts loaded into a book printer and the number of books to be printed; and
    transmit the print job ticket and the one or more user preferences to the book printer; and
  the book printer configured to:
    receive the print job ticket and the one or more user preferences from the operator station; and
    print books in accordance with the print job ticket and the one or more user preferences.

15. The system of claim 14, wherein the book printer is further configured to provide feedback to the operator station.

16. The system of claim 14, wherein the operator station connects to the book printer via a hard line connection or one of a personal area network, a local area network, a metropolitan area network, a wide area network, the Internet, an intranet, an extranet, a virtual private network, a peer-to-peer network, or a wireless self-configuring network.

17. The system of claim 14, wherein the one or more user preferences are associated with one or more preference groups.

18. The system of claim 14, wherein the book printer is further configured to:
  purge an excess number of the loaded book parts; and
  wait for an operator to replenish a deficiency of loaded book parts.

19. The system of claim 14, wherein the operator station is configured to allow an operator to override the one or more user preferences.

20. The system of claim 14, wherein the job ticket and the one or more user preferences are generated at a system configuration level.

* * * * *